United States Patent [19]

Kojima et al.

[11] Patent Number: 4,674,890
[45] Date of Patent: Jun. 23, 1987

[54] TIMER DEVICE FOR AN ELECTRIC RICE COOKER OR LIKE COOKING APPARATUS

[75] Inventors: Mitsuhiro Kojima; Morio Asahi; Ryuuho Narita; Masahiro Imai, all of Nagoya, Japan

[73] Assignee: Kabushiki Kaisha Toshiba, Kawasaki, Japan

[21] Appl. No.: 816,623

[22] Filed: Jan. 6, 1986

[30] Foreign Application Priority Data

Jun. 5, 1985 [JP] Japan ................. 60-121908

[51] Int. Cl.⁴ ............................... G04F 8/00
[52] U.S. Cl. ................... 368/107; 99/327; 368/9; 368/10; 219/441
[58] Field of Search ........... 219/438, 433; 99/468, 99/327, 335; 368/107

[56] References Cited

U.S. PATENT DOCUMENTS

| | | | |
|---|---|---|---|
| 4,234,783 | 11/1980 | Aoshima | 219/438 |
| 4,313,051 | 1/1982 | Aoshima | 219/438 |
| 4,315,138 | 2/1982 | Miwa | 219/438 |
| 4,315,139 | 2/1982 | Onishi et al. | 219/438 |
| 4,362,923 | 12/1982 | Aoshima | 219/438 |
| 4,421,974 | 12/1983 | Oota et al. | 219/438 |
| 4,438,324 | 3/1984 | Narita et al. | 219/438 |

FOREIGN PATENT DOCUMENTS

| | | |
|---|---|---|
| 50483 | 3/1985 | Japan . |
| 50482 | 3/1985 | Japan . |
| 50481 | 3/1985 | Japan . |
| 2148543 | 8/1983 | United Kingdom . |

*Primary Examiner*—Bernard Roskoski
*Attorney, Agent, or Firm*—Schwartz, Jeffery, Schwaab, Mack, Blumenthal & Evans

[57] ABSTRACT

A timer for an electric rice cooker includes a switch for setting the current time and a switch for setting the cooking completion time. When the operation of the current time set switch precedes that of the cooking completion time set switch, the cooking operation is started after lapse of a predetermined time period in accordance with the difference time period between the current time set and the cooking completion time set. The cooking operation is completed at the cooking completion time set. When the cooking completion time set switch is operated without preceding operation of the current time set switch so that a cooking completion standby period of time is set, the cooking operation is started after lapse of a leftover period of time, the value of which is obtained by subtracting a cooking period of time from the cooking completion standby period of time set. The cooking operation is completed after lapse of the cooking completion standby time period. The setting of the timer can be done in two ways described above according to the situation.

5 Claims, 17 Drawing Figures

TIMER DEVICE FOR AN ELECTRIC RICE COOKER OR LIKE COOKING APPARATUS

BACKGROUND OF THE INVENTION

1. Field of the Invention

This invention relates to a timer device for an electric rice cooker or like cooking apparatus by which applying heat to rice or other foodstuff is automatically started after lapse of a period of time set, and more particularly to such a device which is capable of selectively setting either the cooking completion time and the current time or the cooking completion standby period of time.

2. Description of the Prior Art

In an electric rice cooker which employs the cooking control circuitry comprised of a microcomputer, for example, the cooking operation is completed under timer control after lapse of a desired period of time by using a timing function given to the microcomputer. This cooking operation is so called "timer-controlled cooking operation." This type of rice cooker has a switch for setting a standby period of time, and the cooking operation is started after lapse of the standby period of time set. The operator must, however, calculate the cooking start time which value is obtained by subtracting the value of a cooking period of time from the value of desired cooking completion time. Further, the operator must calculate the standby period of time which value is obtained by subtracting the value of the current time from the value of the cooking start time and set the standby period of time in the timer device. This setting mode is referred to as "standby time period set mode." Thus the prior art rice cooker forces the operator into troublesome calculation in setting the standby period of time.

In order to overcome defects of the prior art rice cooker described above, the inventors have contemplated that a necessary standby period of time is calculated in the microcomputer when the operator inputs a current time data and a desired cooking completion time data, the cooking operation being started after lapse of the standby time period. This setting mode is referred to as "time set mode." For example, when the operator sets the timer to cook rice for the next morning meal before sleeping at night in accordance with the standby time period set mode, he or she is forced into complicated duodecimal calculation. According to the time set mode, what is required of the operator is to set the current time and the desired cooking completion time. However, when the operator sets the timer in the afternoon to cook rice for the evening meal at about seven o'clock, he or she would rather mentally calculate the difference value between the desired cooking completion time and the current time to set in the timer according to the standby time period set mode than set the current time and the cooking completion time. That is, even when the operator can easily find the difference value between the desired cooking completion time and the current time, the operator is forced to set the current time and the cooking completion time one by one in accordance with the time set mode.

SUMMARY OF THE INVENTION

Therefore, an object of this invention is to provide an improved timer device for an electric rice cooker or like cooking apparatus by which cooking operation is capable of being selectively executed under timer control according either to the time set mode or to the standby time period set mode.

According to this invention, the improved timer device comprises a current time set switch, a cooking completion time set switch and circuit means. When the operation of the cooking completion time set switch follows the operation of the current time set switch, a fixed value of a cooking time period is subtracted from the cooking completion time set so that a leftover period of time between the current time and the cooking start time is obtained. The timer device of this invention further includes a means for generating a cooking start signal after lapse of the leftover time period.

According to the arrangement described above, when the operation of the current time set switch precedes the operation of the cooking completion time set switch, the cooking operation is started so that it is completed at about the cooking completion time set. This setting mode is called the time set mode and preferable in a case where there is a long period of time between the current time and the cooking completion time, the operator being forced into complicated calculation.

When the cooking completion time set switch is operated without preceding operation of the current time set switch, the standby period of time between the current time and the cooking completion time is automatically set in the timer device. This setting mode is called the standby time period set mode. It is preferable that this setting mode is selected in a case where there is a short period of time between the current time and the desired cooking completion time, the operator easily finding the difference time period value therebetween. As a result, small number of times to operate the switches enables the operator to operate the timer device with ease.

According to a further definite arrangement of the timer device of this invention, the timer device includes a selective means for deciding which of the current time set switch and the cooking completion time set switch has been operated first and for storing an operation order data thereof. The selective means is held at a first state when the operation of the current time set switch precedes the operation of the cooking completion time set switch, and is held at a second state otherwise. As a result that the selective means is held at the first state, a first storage means is allowed to store the cooking completion time data set with the cooking completion time set switch. The timer device includes a calculator for calculating the difference period of time between the cooking completion time the data of which is stored in the first storage means and the current time the data of which is stored in a current time data storage means. A second storage means stores a data of the cooking completion standby time period which is allowed to be set with the cooking completion time set switch as the result that the selective means is held at the second state. The data of the difference time period between the cooking completion time and the current time is loaded to a timing means as the result that the selective means is held at the first state. The cooking completion standby time period data stored in the second storage means is loaded to the timing means as the result that the selective means is held at the second state. In the timing means, the value of the fixed cooking time period is subtracted either from the value of the difference time period between the cooking completion time and the current time or from the value of the cooking completion standby time period. A decision means generates a cooking start signal to start energizing the heater after lapse of the leftover time period calculated in the timing means.

Other and further objects of this invention will become obvious upon an understanding of the illustrative embodiment about to be described or will be indicated in the appended claims, and various advantages not referred to herein will occur to one skilled in the art upon employment of the invention in practice.

DETAILED DESCRIPTION OF A PREFERRED EMBODIMENT

Figure 2:
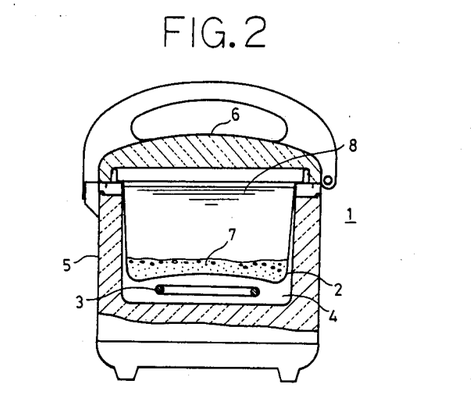
FIG. 2 is a schematic sectional view of an electric rice cooker employing the timer device shown in FIG. 1.

An embodiment will now be described with reference to the drawings. FIG. 2 illustrates an electric rice cooker 1 employing a timer device of this invention. A cooking pot or kettle 2 is detachably placed in the inner surface of a thermally insulating case 5. The case 5 has a heat-applying chamber 4 in which a cooking heater 3 is provided. A lid 6 is mounted on the upper opening of the case 5 and movable about a hinge shaft(not shown). The kettle 2 contains a suitable amount of rice 7 and a proper amount of water 8 to be cooked. The lid 6 keeps the upper opening of the kettle tightly closed during cooking operation. The rice cooker 1 starts the cooking operation upon energization of the cooking heater 3. Water 8 contained in the kettle 2 boils after a while, evaporating or absorbed into rice 7 to disappear. In this disclosure the "cooking completion time" refers either to the time when the boiled water disappears or to the time when about fifteen to thirty minutes elapse after disappearance of boiled water so that rice is ripened.

Figure 1:
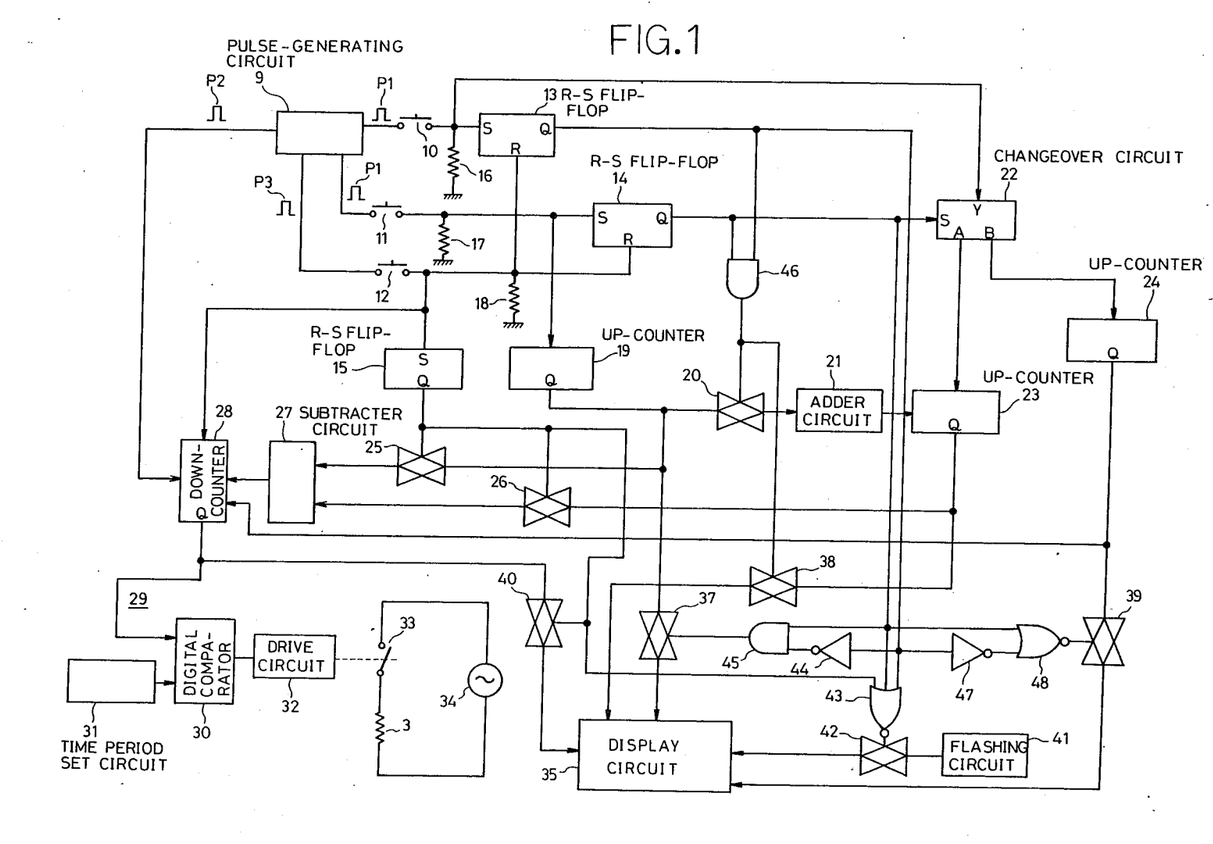
FIG. 1 is a block diagram showing an electric arrangement of a timer device together with a cooking heater circuit according to an embodiment of the invention.

FIG. 1 illustrates the cooking control circuitry employed in the rice cooker 1. The control circuitry includes a pulse-generating circuit 9 which generates high level key-scanning pulses P1 at one second intervals, a cooking completion time set switch 10, a current time set switch 11, a cooking set switch 12 and R-S flip-flops 13 through 15. Set terminals S of the R-S flip-flops 13-15 are normally held at the high-level voltage by pull-down resistors 16 through 18 respectively. The set terminals S are connected through switches 10 through 12 respectively to the pulse-generating circuit 9. A time data, "12:00" as an initial value is set in an up-counter 19 which serves as a current time data storage means. In this case, "12:00" refers to "twelve o'clock."

The up-counter 19 receives high-level pulses P1 at one second intervals upon ON-operation of the current time set switch 11 and starts the counting operating so that the initial value is increased in the form of "ten minutes" unit, and thereby setting the current time. An output terminal Q of the up-counter 19 is connected through an analog switch 20 to an adder circuit 21 which adds the value of a cooking time period, for example, "1:20," to the value of the current time set in the up-counter 19. An input terminal Y of a changeover circuit 22 comprised of such a selective means as a multiplexer is connected to an output end of the cooking completion time set switch 10. A select terminal S of the changeover circuit 22 is connected to an output terminal S of the R-S flip-flop 14. The changeover circuit 22 is allowed to be conductive across terminals Y and A as a result that the select terminal S of the changeover circuit 22 turns to the high level upon ON-operation of the current time set switch 11. On the other hand, the changeover circuit 22 is allowed to be conductive across terminals Y and B as a result that the R-S flip-flop 14 is reset due to ON-operation of the cooking set switch 12. An up-counter 23 serving as a first storage means adds to the initial value supplied to the adder circuit 21 the time value corresponding to the signals given through the changeover circuit 22 by the cooking completion time set switch 10, at one second intervals, for example, and thereby setting the cooking completion time.

An up-counter 24 in which the initial value, "1:20" is fixedly set serves as a second storage means. An input terminal of the up-counter 24 is connected to an output terminal B of the changeover circuit 22. In the condition where the changeover circuit 22 is allowed to be conductive across the terminals Y and B, the up-counter 24 starts the counting operation upon ON-operation of the cooking completion time set switch 10 so that the initial value, "1:20" is increased in the form of "ten minutes" unit, and thereby setting a cooking completion standby period of time in the up-counter 24. Output terminals Q of the up-counters 19 and 23 are connected through analog switches 25 and 26 respectively to a subtracter circuit 27 as a calculating means. The subtracter circuit 27 calculates the leftover length of time which is the difference value between the current time, the data of which is supplied from the up-counter 19, and the cooking completion time, the data of which is supplied from the up-counter 23. The leftover time length data is loaded to a down-counter 28 as a timing means through one of two input ends thereof. An output terminal Q of the up-counter 24 is connected to the other end of the down-counter 28 and the cooking completion time length data is loaded to the down-counter 28 therethrough. As the down-counter 28 is given a time-counting function to count clock pulses P2 generated at one minute intervals by the pulse-generating circuit 9, it starts the counting operation upon receipt of a start signal P3 due to ON-operation of the cooking set switch 4. As a result, the time value loaded to the down-counter 28 is decreased in the form of "one-minute" unit every one minute, and thereby obtaining a leftover time length data. The data of leftover time length decreasing is supplied to a digital comparator 30 composing a determining circuit 29. Besides the leftover time length data, a reference time period data, "1:20," for example, which corresponds to the cooking period of time, is always supplied to the digital comparator 30 from a time period set circuit 31 composing the determining circuit 29. The digital comparator 30 compares the leftover period of time with the reference period of time and generates a cooking start signal P4 when the value of the leftover time period becomes equal to the value of the reference time period. The cooking start signal P4 is supplied to a drive circuit 32. Upon receipt of the cooking signal P4, the drive circuit 32 has a relay switch 33 close and open in accordance with a predetermined pattern. Thus the cooking heater 3 is energized from an AC power source 34 and the cooking operation is executed.

A display circuit 35 includes a display device 36 composed of four display sections, each section having seven display segments(shown in FIGS. 3–10c). Output terminals Q of the up-counters 19, 23 and 24 and of the down coutner 28 are connected through analog switches 37 through 40 respectively to the display circuit 35. The current time, the cooking completion time, the cooking completion standby period of time and the leftover period of time set in the counters respectively are selectively displayed in the display device 36 when each of the analog switches 37 through 40 is closed. A flashing circuit 41 is connected through an analog switch 42 to the display circuit 35 and supplies a flashing signal to the display device 36 to flash the displayed data when the analog switch 42 is closed.

Each of the analog switches 20, 25, 26, 37–40 and 42 is closed when its gate turns to the high level and is opened when its gate turns to the low level.

The operation of the timer device will hereinafter be described.

(i) The initial state where none of the switches 10, 11 and 12 are closed will first be described. Each output terminal Q of the R-S flip-flops 13–15 is in the low voltage. The analog switches 37–40 opens. As an output terminal of a 3-input NOR circuit 43 is in the low level, the analog switch 42 is closed. The flashing circuit 41 supplies a signal to the display circuit 35 to flash the data, "00:00" displayed in the display device 36.

Figure 3:
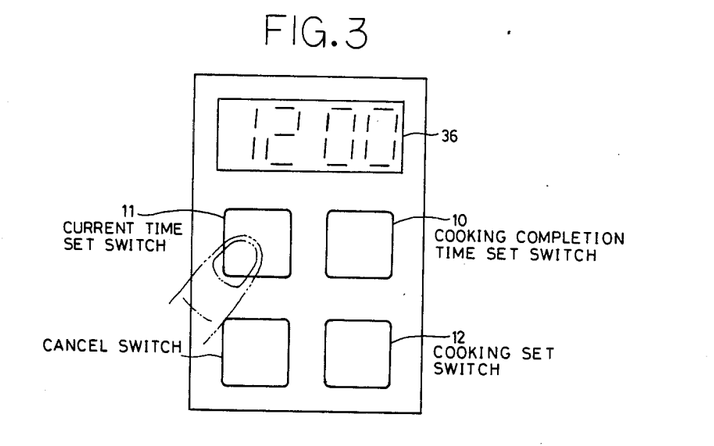
FIG. 3 is an elevational view of a control panel of the rice cooker of FIG. 2 in the case where the current time is set and displayed in a display device thereof.
Figure 4A:
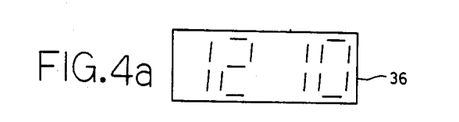
FIGS. 4a through 4c are elevational views of the display device which illustrate the procedure to set the current time.
Figure 4B:
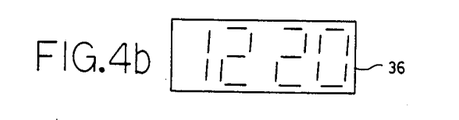
Figure 4C:
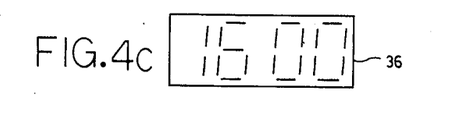

(ii) A case where ON-operation of the current time set switch 11 precedes ON-operation of the cooking completion time set switch 10 in the above-described initial state will be described. The output terminal Q of the R-S flip-flop 14 turns to the high level upon ON-operation of the current time set switch 11. The output terminal of the 3-input NOR circuit 43 turns to the low level and the analog switch 42 is opened, so that the data, "00:00" disappears from the display screen. At the same time, an output terminal of an AND circuit 45 turns to the high level and the analog switch 37 is closed. As a result, a time period data is supplied to the display circuit 35 from the up-counter 19 and displayed in the display device 36. As the initial value, "12:00" is set in the up-counter 19 beforehand, the data, "12:00" is displayed in the display device 36 first as shown in FIG. 3. The time value set in the up-counter 19 increases in the form of "ten minutes" unit in accordance with the number of times of ON-operation of the current time set switch 11 or the continuous period of time of ON-operation thereof as shown in FIGS. 4a and 4b, so that the operator sets a time value approximating the current time in the up-counter 19, looking at the data displayed in the display device 36. It is assumed, for the sake of description, that the time value, "16:00" (4:00 p.m.) as the current time is set in the up-counter 19.

The changeover circuit 22 is allowed to be conductive across terminals Y and A as a result that the output terminal Q of the R-S flip-flop 14 turns to the high level.

Figure 5:
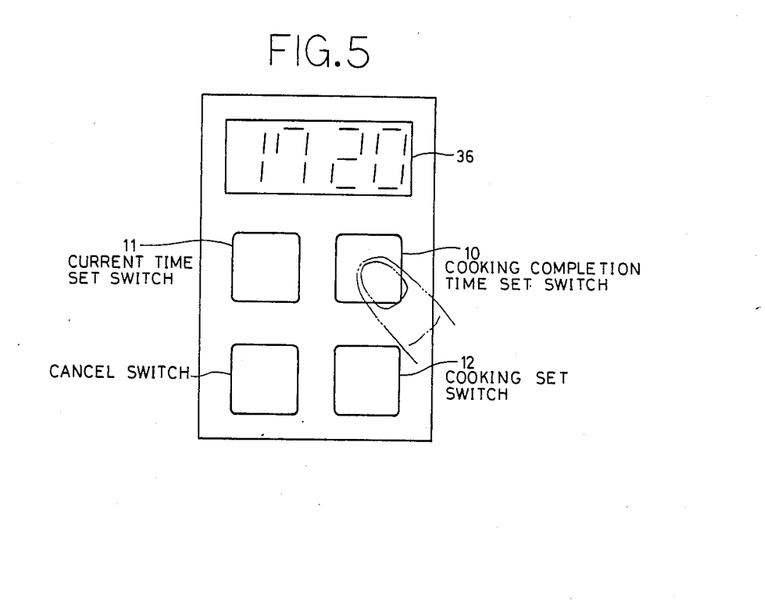
FIG. 5 is a view similar to FIG. 3 in which the cooking completion time is set and displayed in the display device.
Figure 6A:
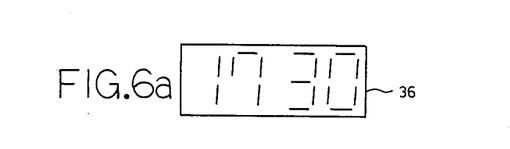
FIGS. 6a through 6c are elevational views of the display device which illustrate the procedure to set the cooking completion time.
Figures 6B, 6C:
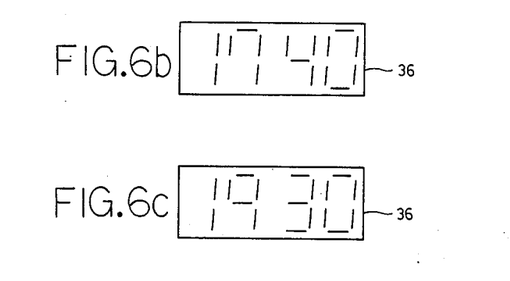

ON-operation of the cooking completion time set switch 10 has the output terminal Q of the R-S flip-flop 13 turn to the high level. The output terminal of an AND circuit 46 turns to the high level, so that both analog switches 20 and 38 are closed. Data of the current time, "16:00" set in the up-counter 19 is supplied to the adder circuit 21 due to the closing of the analog switch 20. The adder circuit 21 adds the value of the cooking time period, "1:20" to the current time, "16:00" to obtain the added value, "17:20," which data is supplied to the up-counter 23 as an initial value. The data, "17:20" is further supplied to the display circuit 35 through the analog switch 38 which is closed due to high level output from the AND circuit 46. In this case, the output terminal Q of the R-S flip-flop 13 turns to the high level, so that the output terminal of the AND circuit 45 turns to the low level and the analog switch 37 is opened. As a result, the current time data, "16:00" displayed in the display device 36 is replaced by the data, "17:20" as shown in FIG. 5. As the changeover circuit 22 is already allowed to be conductive across terminals Y and A, the counted value with the up-counter 23, that is, the value displayed in the display device 36, is increased in the form of "ten minutes" unit in accordance with the number of times of ON-operation of the cooking completion time set switch 10 or the continuous period of time of ON-operation thereof as shown in FIGS. 6a and 6b. Thus the operator sets the cooking completion time in the up-counter 23. It is assumed, in this case, that the value, "19:30" is set in the up-counter 23.

Figure 7:
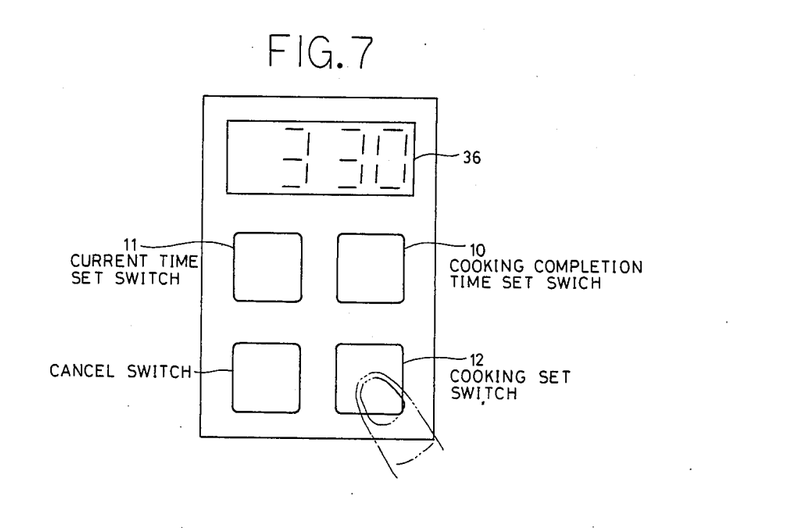
FIG. 7 is a view similar to FIG. 3 in which a cooking set switch is set.
Figure 8A:
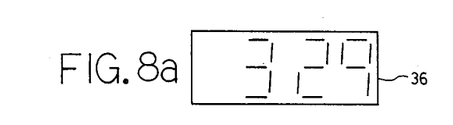
FIGS. 8a and 8b are elevational views which illustrate the display device displaying lapse of the leftover time period.
Figure 8B:
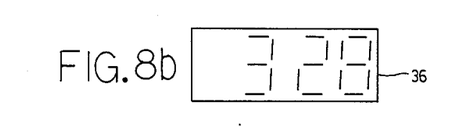
Figure 9:
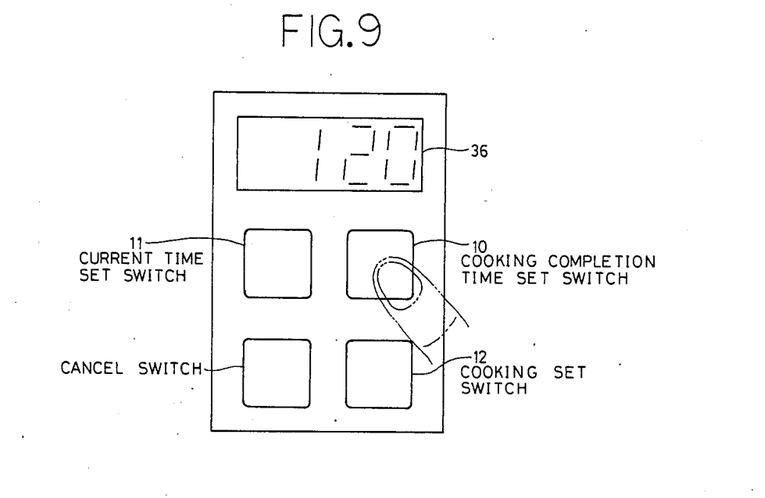
FIG. 9 is a view similar to FIG. 3 in which a cooking completion standby period of time is displayed in the display device according to the standby time period set mode.

Afterwards, both R-S flip-flops 13 and 14 are reset and the R-S flip-flop 15 is set when the cooking set switch 12 is turned on. The output terminal Q of the R-S flip-flop 15 turns to the high level and the analog switches 25 and 26 are closed, so that the current time data, "16:00" set in the up-counter 19 and the cooking completion time data, "19:30" set in the up-counter 24 are supplied to the subtracter circuit 27. The subtracter circuit 27 calculates the difference value between the current time and the cooking completion time, the data of which is loaded to the down-counter 28. As the R-S flip-flops 13 and 14 are already reset, the analog switch 38 is opened. Further, the analog switch 40 is turned on due to the setting of the R-S flip-flop 15. As a result, the difference time length data, "3:30" loaded to the down-counter 28, that is, the initial value of the leftover length of time, is displayed in the display device 36 as shown in FIG. 7. Upon receipt of the start signal P3 due to ON-operation of the cooking set switch 12, the down-counter 28 starts counting the clock pulses P2 at one minute intervals so that the decreasing value of the leftover time period is sequentially displayed in the display device 36 as shown in FIGS. 8a and 8b. At the same time, the data of decreasing leftover time period supplied from the down-counter 28 is sequentially transmitted to the digital comparator 30. When two hours and ten minutes elapses from the time of ON-operation of the cooking set switch, the value of the leftover time length becomes equal to the reference time period, "1:20" as the cooking period of time, the data of which is supplied from the time period set circuit 31. The digital comparator 30 generates the cooking start signal P4 when it determines that the leftover time length becomes equal to the reference time period. When the drive circuit 32 receives the cooking start signal P4 from the digital comparator 30, the cooking heater 3 is energized so that the cooking operation is started. The cooking operation is completed when approximately one hour and twenty minutes elapse from the cooking start time, that is, at the cooking completion time, "19:30" set in the up-counter 24.

According to the embodiment heretofore described, in the case where the operation of the current time set switch 11 precedes the operation of the cooking completion time set switch 10, the cooking operation is started after lapse of two hours and ten minutes from the time of ON-operation of the cooking set switch 12 in accordance with the difference value, "3:30" between the current time, "16:00" set with the switch 11 and the cooking completion time, "19:30" set with the switch 10. The value, two hours and 10 minutes, is obtained by subtracting the cooking length of time from the difference value between the current time and the cooking completion time. The cooking operation is completed at the cooking completion time.

According to the setting mode employed for the prior art timer, the operator is forced into complicated calculation in setting the cooking completion standby length of time: the operator must calculate the cooking start time by subtracting the cooking length of time from the desired cooking completion time and further calculate the standby period of time by subtracting the current time from the cooking start time, and thereby setting the standby period of time in the timer. In this invention, however, the time set mode is employed, that is, the operator has only to set the current time and the cooking completion time in the timer device. As a result, the operator is not forced into complicated calculation.

In the embodiment heretofore described, the time values, "16:00" and "19:30" are applied to the current time and the cooking completion time respectively for the sake of description. In the case, however, where the operator sets the timer of the rice cooker before sleeping at night for the next morning meal, duodecimal time calculation becomes more complicated. Taking such a case into consideration, the advantage from this invention is greater.

Further, the time data which is obtained by adding the cooking length of time to the value of the current time is loaded to the up-counter 23 as the initial value. In setting the cooking completion time, the up-counter 23 counts the key-scanning pulses P1 so that the initial value is successively increased, thereby preventing value of the cooking completion time from becoming smaller than value of the cooking period of time. Further, as the initial value includes the current time, the period of time required for setting the current time in the up-counter 23 becomes shorter.

Figure 10A:
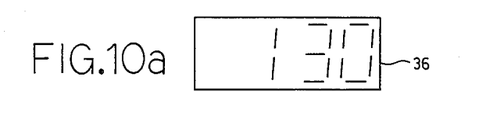
FIGS. 10a through 10c are elevational views of the display device of FIG. 9 which displays lapse of the standby time period.
Figure 10B:
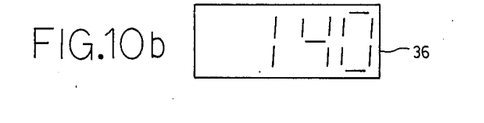
Figure 10C:
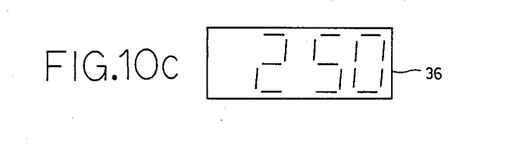

(iii) When the cooking completion time set switch 10 is operated in the afore-mentioned initial state without preceding operation of the current time set switch 11, the output terminal of the R-S flip-flop 13 turns to the high level while the output terminals of the R-S flip-flops 14 and 15 are held at the low level. The change-over circuit 22 is allowed to be conductive across terminals Y and B. A low level signal is supplied to a NOR circuit 48 from an inverter circuit 47, so that the analog switch 39 is closed. As a result, data of the initial value, "1:20" (cooking period of time) fixedly set in the up-counter 24 is displayed in the display device 36(see FIG. 9). The up-counter 24 starts the counting operation so that the initial value is increased in the form of "ten minutes" unit in accordance with the number of times of ON-operation of the cooking completion time set switch 10 or with a period of time of ON-operation thereof. The data displayed in the display device 36 sequentially changes as shown in FIGS. 10a and 10b Looking at the displayed data, the operator sets a desired cooking completion standby period of time. In this case, it is assumed that the value, "2:50" (which refers to "two hours and fifty minutes") as the cooking completion standby period of time is set as shown in FIG. 10c. Data of the cooking completion standby time period thus set in the up-counter 24 is loaded as a leftover time period data to the down-counter 28. Upon ON-operation of the cooking set switch 12, the down-counter 28 starts counting the clock pulses P2 at one minute intervals so that the value of the leftover time period is decreased. The R-S flip-flop 15 is also set due to ON-operation of the cooking set switch 12. The left-over time length data is sequentially supplied to the digital comparator 30 and the display circuit 35 through the analog switch 40 which is closed due to inversion of the R-S flip-flop 15 to the set state. As a result, the leftover time period data is sequentially displayed in the display device 36. The digital comparator 30 generates a cooking start signal P4 and the cooking operation is started when one hour and thirty minutes, which value is obtained by subtracting the cooking period of time(one hour and twenty minutes) from the cooking completion standby period of time(two hours and fifty minutes), elapse from the time of ON-operation of the cooking set switch 12. The cooking operation is completed after lapse of the cooking completion standby time length set in the up-counter 24.

According to the present invention, when the cooking completion time set switch 10 is operated for setting the cooking completion standby period of time in the up-counter 24 without preceding operation of the current time set switch 10, the rice cooker starts the cooking operation one hour and thirty minutes(corresponding to the difference value between the cooking completion standby period of time and the cooking period of time) after the time of ON-operation of the cooking set switch 12. The cooking operation is completed after lapse of the cooking completion standby period of time. In addition to the afore-mentioned time set mode, the timer device of this invention provides the so-called standby time period set mode. Accordingly when the operator can easily find the difference value between the current time and the cooking completion time, he or she has only to operate the cooking completion period of time set switch 10 in accordance with the standby time period mode. As a result, the operator need not operate both of the current time set switch 11 and the cooking completion time set switch 10, thereby simplifying operation of the timer device. The setting of timer device in accordance with the standby period of time set mode is suitable for the case where the cooking operation should be started within a short period of time. Further, data of the cooking time period is loaded to the up-counter 24 as the initial value, thereby preventing the cooking completion standby period of time, the value of which is smaller than that of the cooking period of time, from being set therein.

While the cooking control circuitry described above is composed of logic circuits and so on, it may consist of a microcomputer. Although both of the cooking completion time and the cooking completion standby period of time are set through up-counting action of the counter in the embodiment, one may be set through up-counting action while the other may be set through down-counting action, or one may be set through down-counting action of the counter in the form of "ten minutes" unit while the other may be set through down-counting action of the counter in the form of "thirty minutes" unit.

What is claimed is:

1. A timer device for an electric rice cooker or like cooking apparatus, comprising:
   (a) a switch for setting the current time;
   (b) a switch for setting the cooking completion time;
   (c) a means for calculating a leftover length of time by subtracting a predetermined length of time corresponding to a length of time needed for completing the cooking operation from the difference length of time between the current time set with said current time set switch and the cooking completion time set with said cooking completion time set switch in the case where said cooking completion time set switch is operated after the operation of said current time set switch;
   (d) a means for calculating a leftover length of time by subtracting the predetermined length of time corresponding to the length of time needed for completing the cooking operation from the cooking completion standby length of time set with said cooking completion time set switch in the case where said cooking completion time set switch is operated without preceding operation of the current time set switch; and
   (e) a means for generating a cooking operation start signal after lapse of either of said leftover lengths of time.

2. A timer device for an electric rice cooker or like cooking apparatus, comprising:
   (a) a switch for setting the current time;
   (b) a switch for setting the cooking completion time;
   (c) a selective means held at a first state in the case where the operation of said current time set switch precedes the operation of said cooking completion time set switch, said selective means being held at a second state otherwise;
   (d) a means for storing data representing the current time set with said current time set switch;
   (e) a first storage means for storing data representing the desired cooking completion time set with said cooking completion time set switch when said selective means is held at the first state;
   (f) a means for calculating the length of time difference between the current time, which data is stored in said current time data storage means and the cooking completion time, which data is stored in said first storage means;
   (g) a second storage means for storing data of a cooking completion standby time length set with said cooking completion time set switch when said selective means is held at the second state;
   (h) a time-counting means to which said data of the difference time length difference is loaded as a set time length data by said calculating means when said selective means is held at the first state and to which said data of the cooking completion standby time length is loaded as a set time length data by said second storage means when said selective means is held at the second state; and
   (i) a determining means for substracting a predetermined length of time corresponding to a length of time needed for completing the cooking operation from either of said data of set time length loaded to said timecounting means to obtain the leftover length of time, said determining means generating a cooking operation start signal after lapse of said leftover length of time.

3. A timer device for an electric rice cooker or like cooking apparatus, comprising:
   (a) a switch for setting the current time;
   (b) a switch for setting the cooking completion time;
   (c) a selective means held at a first state in the case where the operation of said current time set switch precedes the operation of said cooking completion time set switch, said selective means being held at a second state otherwise;
   (d) a means for storing data representing the current time set with said current time set switch;
   (e) a means for adding a predetermined length of time corresponding to a length of time needed for completing the cooking operation to the current time to obtain an initial value;
   (f) a first storage means for storing data representing the desired cooking completion time in the case where said selective means is held at the first state, said data of the desired cooking completion time being obtained by adding to said initial value a value of time length which data is supplied from said cooking completion time set switch;
   (g) a means for calculating the length of time difference between the current time which data is stored in said current time data storage emans and the cooking completion time which data is stored in said first storage means;
   (h) a second storage means for storing data representing a cooking completion standby time length by adding the value of time length which data is supplied from said cooking completion time set switch, to the length of time needed for completing the cooking operation, which data is previously stored therein when said selective means is held at the second state;
   (i) a time-counting means to which said data of the time length difference is loaded as a set length of time by said calculating means when said selective means is held at the first state and to which said data of the cooking completion standby time length is loaded as a set time length data by said second storage means when said selective means is held at the second state; and
   (j) a determining means for subtracting a length of time corresponding to the time length needed for completing the cooking operation from said data of set time length loaded to said time-counting means to obtain a leftover length of time, said determining means generating a cooking operation start signal after lapse of said leftover length of time.

4. A timer device for an electric rice cooker or like cooking apparatus as set forth in claim 3, wherein each of said current time storage means, said first storage means and said second storage means is comprised of a counter which counts pulses generated with the operation of said set switches so that the setting of the time is executed by counting the pulses generated by a suitable pulse-generator.

5. A timer device for an electric rice cooker or like cooking apparatus as set forth in claim 4, wherein said time-counting means is a down-counter which counts clock pulses and wherein said determining means comprises a time period set circuit for setting the length of time needed for completing the cooking operation and a comparator which compares a value obtained by the counting operation of said down-counter with the time length data supplied from said time period set circuit to generate a cooking operation start signal when the value obtained by the counting operation of said down-counter agrees with the value of the time length data supplied from said time period set circuit.

* * * * *